United States Patent [19]

Acampora et al.

[11] Patent Number: 5,497,504

[45] Date of Patent: Mar. 5, 1996

[54] SYSTEM AND METHOD FOR CONNECTION CONTROL IN MOBILE COMMUNICATIONS

[75] Inventors: Anthony S. Acampora, Freehold, N.J.; Mahmoud Naghshineh, Fishkill, N.Y.

[73] Assignee: The Trustees of Columbia University, New York, N.Y.

[21] Appl. No.: 243,264

[22] Filed: May 13, 1994

[51] Int. Cl.$^6$ ........................................... H04M 11/00
[52] U.S. Cl. .................. 455/33.2; 455/34.1; 455/63; 379/59; 379/60
[58] Field of Search ................... 455/33.1, 33.2, 455/33.4, 34.1, 51.1, 56.1, 63, 67.1; 379/59, 60

[56] References Cited

U.S. PATENT DOCUMENTS 5,301,356  4/1994  Bodin et al. .......................... 455/33.2

OTHER PUBLICATIONS

J. Zander, "Performance of Optimum Transmitter Power Control in Cellular Radio Systems," *IEEE Transactions on Vehicular Technology*, vol. 41, No. 1, pp. 57–62, Feb. 1992.
S. Tekinay et al., "Handover and Channel Assignment in Mobile Cellular Networks," *IEEE Communications Magazine*, vol. 29, No. 11, pp. 42–46, Nov. 1991.
C. I et al., "A Microcell/Macrocell Cellular Architecture for Low–and High–Mobility Wireless Users," *IEEE Journal of Selected Areas in Communications*, vol. 11, No. 6, pp. 885–891, Aug. 1993.
R. Guérin, "Queuing–Blocking System with Two Arrival Streams and Guard Channels," *IEEE Transactions on Communications*, vol. 36, No. 2, pp. 153–163, Feb. 1988.
S. Oh et al., "Prioritized Channel Assignment in a Cellular Radio Network," *IEEE Transactions on Communications*, vol. 40, No. 7, pp. 1259–1269, Jul. 1992.
C. I et al., "A Microcell/Macrocell Cellular Architecture for Low–and High–Mobility Wireless Users," *Globecom '91*, pp. 1006–1011.
S. Grandhi et al,. "Centralized Power Control in Cellular Radio Systems," *IEEE Transactions on Vehicular Technology*, vol. 42, No. 4, pp. 466–468, Nov. 1993.
S. Chia et al., "Mixed Cell Architecture and Handover," BT Laboratories, Oct. 10/1–10/5.
M. Wernik et al., "Traffic Management for B–ISDN Services," *IEEE Network*, pp. 10–19, Sep. 1992.
A. Eckberg, "B–ISDN/ATM Traffic and Congestion Control," *IEEE Network*, pp. 28–36, Sep. 1992.
J. Turner, "Managing Bandwidth in ATM Networks with Bursty Traffic," *IEEE Network*, pp. 50–57, Sep. 1992.
C. Lea, "What Should Be the Goal for ATM," *IEEE Network*, pp. 60–66, Sep. 1992.
I. Habib et al., "Controlling Flow and Avoiding Congestion in Broadband Networks," *IEEE Communications Magazine*, pp. 46–53, Oct. 1991.
A. Lazar et al., "Control of Resources in Broadband Networks with Quality of Service Guarantees," *IEEE Communications Magazine*, pp., 66–73, Oct. 1991.
G. Gallassi et al., "Resource Management and Dimensioning in ATM Networks," *IEEE Network Magazine*, pp. 8–17, May 1990.
R. Jain, "Congestion Control in Computer Networks: Issues and Trends," *IEEE Network Magazine*, pp. 24–30, May 1990.
*IEEE Personal Communications*; Acampora et al; "Control and Quality of Service Provisioning in High–Speed Microcellular Networks" 2nd Quarter 1994 pp. 36–43.

*Primary Examiner*—Reinhard J. Eisenzopf
*Assistant Examiner*—Andrew Faile
*Attorney, Agent, or Firm*—Brumbaugh, Graves, Donohue & Raymond

[57] ABSTRACT

In a mobile communications network, cell-clusters are defined to include a multiplicity of cells. Wireless connections within the network are classified based on the actions taken for the connections when a radio congestion state is encountered. A cell-cluster controller controls admission of new calls to the cell-cluster, and admits or rejects the calls based on (1) number of existing calls of each class in the cell-cluster, (2) traffic characteristics including call holding time and a hand-off rate of each class, (3) quality-of-service (QOS) requirements of each class, and (4) policy for scheduling or sharing different call classes at each base station of the cell-cluster.

40 Claims, 5 Drawing Sheets

| TYPE A | TYPE B | TYPE C |
|--------|--------|--------|
| K | 0 | 10 |
| K-1 | 1 | 5 |
| ⋮ | ⋮ | ⋮ |
| 0 | L | 0 |
| ⋮ | ⋮ | ⋮ |
| 0 | 0 | M |

SYSTEM AND METHOD FOR CONNECTION CONTROL IN MOBILE COMMUNICATIONS

TECHNICAL FIELD

This invention relates to mobile communications systems and more particularly to call admission and connection controls in such systems.

BACKGROUND OF THE INVENTION

In recent years, the popularity of mobile communications has increased immensely and is expected to grow in the near future to the point where existing systems will be unable to support the demand for such communications. A major problem facing the future of mobile communications systems is the scarcity of available bandwidth in a wireless network for the mobile user's transmission to a fixed network.

Current mobile communications systems employ the concept of "Cells." A cell is a geographical area which is assigned to a corresponding base station which is in turn wired into the fixed network. This fixed network is typically a "mesh network," and is comprised of numerous switches connected together by communication links. The mesh network is set up so that a communications route may be traced from any one switch to any other in the network through at least one, and more often, many combinations of links and switches. Some of the switches in the network, in addition to being connected to other switches, are also connected via communication links to one or more of the base stations and/or fixed termination points such as a home telephone.

When a mobile user places a call on his/her wireless terminal, the call is transmitted through the wireless network comprising radio channels, to a base station assigned to the user's cell. From the base station, the call is carried by the mesh network to the user's intended destination. When the mobile user moves from one cell to another, a call hand-off, or hand-over, between base stations takes place.

Due to the limited bandwidth available for the wireless transmissions of mobile users' calls, each cell can handle only a limited number of calls. Overload conditions occur when the communication needs of wireless terminals populating a small area exceed the total capacity of all access points within their reach. This situation is referred to as a "radio congestion state." Such a state may be encountered during a hand-off, resulting in connection dropping, long delays, and/or packet losses.

Attempts have been made to reduce the likelihood of occurrences of the radio congestion state. One such attempt requires a base station having spare capacities to accommodate some of the mobile users in a neighboring cell experiencing a congestion state. Two prior art techniques using this approach include a power control technique described in: J. Zander, "Performance of Optimum Transmitter Power Control in Cellular Radio Systems," *IEEE Transactions on Vehicular Technology*, vol. 41, no. 1, Feb. 1992; and a dynamic or hybrid channel allocation technique described in: S. Tekinary et al., "Handover and Channel Assignment in Mobile Cellular Networks," *IEEE Communications Magazine*, vol. 29, no. 11, Nov. 1991. The power control technique requires the transmission power of a base station to increase so as to effect communications with additional users in the neighboring, congested cell. The increase in the transmission power de facto causes the cell originally assigned to the base station to grow to include the neighboring cell. On the other hand, the dynamic or hybrid channel allocation technique requires that transmission frequencies or channels be rearranged so that mobile users in the congested cell can take advantage of spare capacities not utilized in other cells.

Another attempt to reduce the likelihood of the congestion state occurrence calls for application of a layer architecture for the cellular network. Such an architecture is described in: C. Iet al., "A Microcell/Macrocell Cellular Architecture for Low- and High-Mobility Wireless Users," *IEEE Journal of Selected Areas in Communications*, vol. 11, no. 6, Aug. 1993. In accordance with the layer architecture, an overlay cell is defined to cover multiple cells. When a cell experiences a radio congestion state, a base station assigned to the overlay cell (as opposed to the base station of the congested cell) is used to communicate with the excessive mobile users in the congested cell.

Nonetheless, the above approaches do not impose any control on the admission of new calls. As the number of new calls entering the cellular network increases, the rate of radio congestion state occurrences in such a network becomes unacceptable. Nevertheless, in prior art two connection control techniques have been formulated based on a differentiation of new calls from hand-off calls. In accordance with the technique described in: R. Guerin, "Queuing-Blocking System with Two Arrival Streams and Guard Channels," *IEEE Transactions on Communications*, vol. 36, no. 2, Feb. 1988, a predetermined number of guard channels at each base station are reserved for hand-off calls. Under no circumstances are these guard channels used for new calls. On the other hand, in accordance with the technique described in: Oh et al., "Prioritized Channel Assignment in a Cellular Radio Network," *IEEE Transactions on Communications*, vol. 40, no. 7, Jul. 1992, hand-off calls are afforded a higher priority of service by the base station over new calls. That is, given a limited number of available channels, new calls are blocked in favor of competing hand-off calls.

SUMMARY OF THE INVENTION

In accordance with the invention, cells in a mobile communications system are grouped in one or more cell clusters. Each cell-cluster is assigned a cell-cluster controller for controlling admission of new calls. Each cell-cluster controller is capable of receiving call requests from the cell-cluster assigned thereto. The call requests include requests for establishing new wireless connections of different connection types. These connection types are indicative of at least priorities of use of wireless channels in the mobile communications system. The cell-cluster controller is also capable of providing information (e.g., in the form of a look-up table) including at least one combination of maximum numbers of wireless connections of the different connection types in the cell-cluster. The controller grants a selected call request for establishing a new wireless connection of one of the different connection types based on a comparison of (a) the at least one combination of maximum connection numbers provided for a particular cell-cluster including the cell from which the selected call request was received, with (b) a combination of numbers of wireless connections of the different connection types currently established in said particular cell-cluster.

BRIEF DESCRIPTION OF THE DRAWING

Other objects, features and advantages of the invention will become apparent, and its construction and operation will be better understood, from the following detailed description when read in conjunction with the accompanying drawing, in which.

Throughout the figures of the drawing, the same reference numerals and characters are used to denote like features, elements, components or portions of the illustrated network.

DETAILED DESCRIPTION

Figure 1:
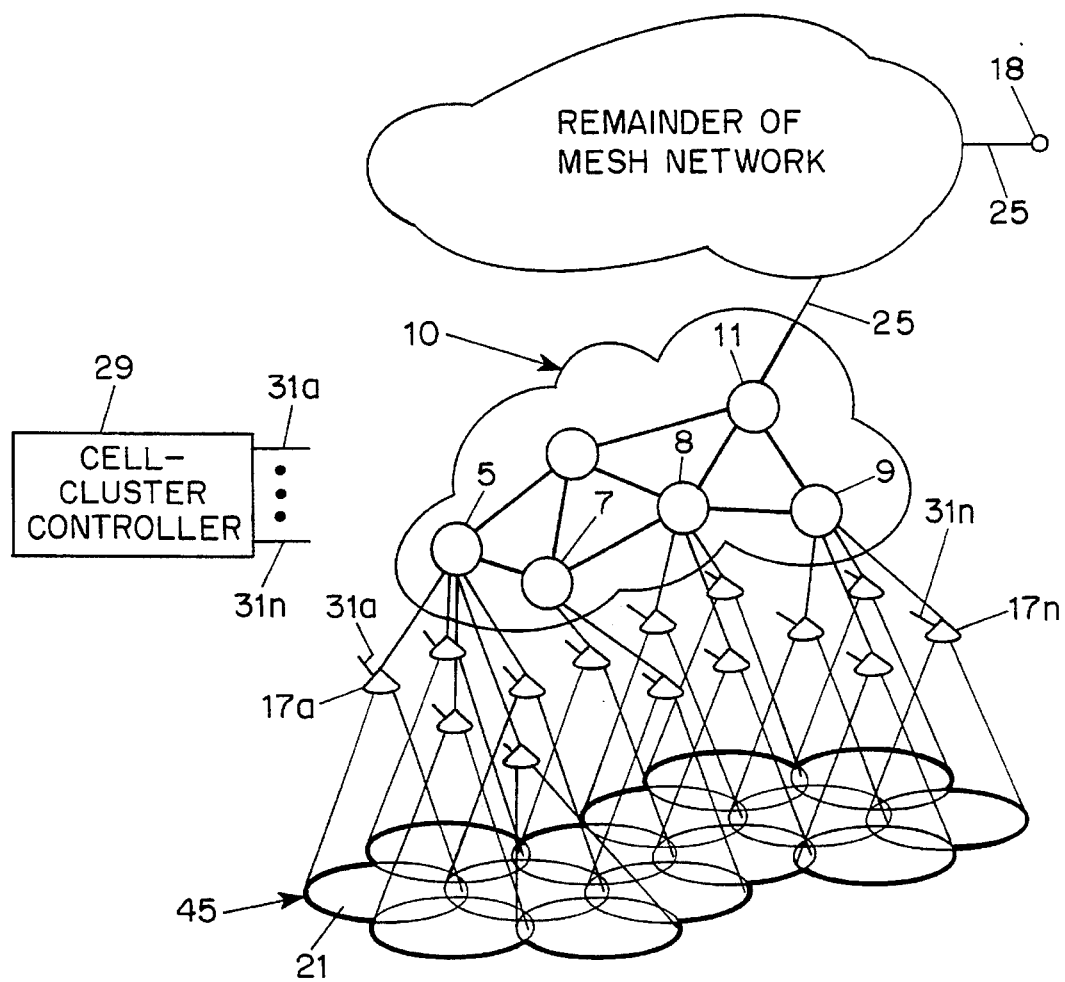
FIG. 1 illustrates a mobile communications network in accordance with the invention.

FIG. 1 illustrates mobile communications network 12 embodying the principles of the invention. In accordance with the invention, cell-clusters are defined within the network and each comprise a group of cells adjacent to one another. In FIG. 1, one such cell-cluster is numerically denoted 45, and comprises 14 interconnected cells which are shown to be enclosed within a thick borderline defining cell cluster 45. In addition, wireless mobile connections in network 12 are classified on the basis of, among other things, different actions needed therefor when a radio congestion state is encountered. The radio congestion state occurs when the communication needs of mobile users exceed the total capacity of all access points within their reach.

Whenever a new mobile call requests admission to a cell within cell-cluster 45, cell-cluster controller 29 admits or rejects the request based on (1) number of existing connections or calls of each class in the cell-cluster, (2) traffic characteristics such as the call holding time and hand-off rate of each class, (3) quality-of-service (QOS) requirements of each class such as a hand-off dropping probability requirement, and (4) the scheduling or sharing policy of different call classes in each base station of the cell-cluster. The structure and operation of controller 29 in accordance with the invention are further described hereinbelow.

It should be pointed out that above condition (1) calls for consideration of the number of existing connections in a cell-cluster as a whole, rather than the entry cell itself. This is consistent with the general finding that, by considering the global state information as opposed to the local state information, the wireless resources can be utilized more efficiently.

With the inventive scheme, once a new call is admitted to cell-cluster 45, it can be freely handed off from one base station to another in the cluster without additional intervention from cell-cluster controller 29, and the likelihood of encountering a radio congestion state is limited to a level defined by the QOS's guaranteed for each class of wireless connections.

In FIG. 1, network 12 comprises a fixed network which is configured in a standard mesh arrangement. The fixed network is in part terminated on base stations 17a through 17n, each assigned to handle wireless communications of mobile users in a respective cell. For instance, base station 17a is assigned to handle wireless communications of mobile users in cell 21.

Backbone network 10 is part of the fixed network and serves all the cells in cell-cluster 45. It should be noted that cell-cluster 45 in FIG. 1 represents just one of a large number of possible cell-cluster configurations. Network 10 extends a connection from a fixed point 11 of the network, called the root, to each one of base stations 17a through 17n. The base station in charge of a mobile user is called the mobile user's access point. Backbone network 10 provides a route, referred to as a virtual channel connection, to the mobile user's access point as well as a virtual channel connection for each of its neighboring base stations such that a concatenation of one of these virtual channel connections with another virtual channel connection 25 provides an end-to-end connection in which the mobile user can be the source or destination of the communications.

For example, a mobile user in cell 21 accesses base station 17a connected to switch 5. Switches 7, 8, and 9 are the switches to which all the neighboring base stations 17b through 17n are connected. In any end-to-end connection for which the mobile user is the source or the destination, the communication path is divided into two parts. One part of the path is contained within backbone network 10. This part of the path changes as the result of the mobile user's connection hand-offs. The other part of the path, which is from the root 11 of the backbone network to the other end of connection 18, remains fixed throughout most of the connection lifetime. It should be noted, however, that the fixed part of the path will not always be necessary. A mobile user may wish to communicate with a destination, fixed or mobile, within the same cell-cluster. In this scenario, the communications will be routed to the root of network 10, but instead of then being switched out of network 10 and through a fixed route, the communications will instead be routed back thereinto to the intended recipient.

In this illustrative embodiment, network 12 is of the type of a broadband integrated services digital network (B-ISDN) utilizing the asynchronous transfer mode (ATM). Like other B-ISDN ATM systems in general, network 12 employs packet, or cell, transport techniques. This means, essentially, that a communication is broken up into discrete "packets", or "cells" (unrelated to the geographic cells of mobile communications systems), which are sent one at a time through the network and received at the intended destination as an uninterrupted communication. As a result, packets from many different mobile users may simultaneously share the same communication link.

Each switch of network 12, for example, switch 5, is of the type of a conventional ATM B-ISDN switch, hereinafter called an ATM switch, and has several input and output ports. The ATM packets communicated in network 12 are themselves divided into two sets of information. One set is the information which the user intends to transmit and the other set is called the "header." The header contains routing information, including a virtual channel identifier (VCI). The VCI, simply put, is a code assigned to the packet which lets an ATM switch know where to send the packet next, based on the switch port where the packet has been received. To this end, the ATM switch comprises a "lookup table." The lookup table may be thought of as having four columns: input port, incoming VCI, output port, and outgoing VCI. For every possible input port and incoming VCI combination, there is a corresponding output port and outgoing VCI combination programmed into the lookup table. When an ATM switch receives a packet at a given port, the ATM switch will find the row in the lookup table which has the incoming VCI and input port which correspond to that of the received packet. The ATM switch will then switch or route the packet to the output port which appears in the same row and replace the incoming VCI in the packet header with the outgoing VCI. This process is performed at each switch until the packet arrives at its destination.

It should be noted at this point that, in the present embodiment, the term "switch" as used should be interpreted to include any switching node or network, such as a local area network (LAN) or metropolitan area network (MAN), which is capable of ATM packet transport based on VCI's. The terms "communication" or "call" as used should be interpreted to include phone, facsimile, and any other types of communications which can be supported by a B-ISDN ATM system.

In this illustrative embodiment, a call hand-off is initiated by a mobile user, and is thus called a mobile initiated hand-off. Alternatively, the hand-off may be initiated by any one of several well-known means. For example, the user may monitor power from each of the base stations in a cell-cluster and initiate a hand-off whenever the signal strength received from the user's current base station approaches some threshold of unacceptability and there is at least one base station in the cluster from which an acceptably high power level is detected. In such a case, the mobile user would initiate a hand-off to any base station from which acceptably high power is detected.

In accordance with the invention, a new call seeking admission to a cell-cluster under a call admission control is treated differently from a hand-off call within same. The call admission control calls for negotiation with cell-cluster controller 29 for, among other things, the class of wireless connections and QoS's needed. In this particular embodiment, three classes (namely, classes I, II and III) of wireless calls or connections have been identified, and are differentiated on the basis of the action taken therefor when a radio congestion state is encountered. In brief, class I connections include real-time connections; class II connections include connection-oriented data connections; and class III connections include those for message-oriented, delay insensitive traffic.

For real time or class I connections such as those for voice and/or video, the connection must be dropped if the mobile moves into a congested area where no wireless channel is available. Thus, an important QOS metric of a class I connection is a hand-off dropping probability, which measures the likelihood of a call being dropped or terminated during a hand-off. Due to the delay intolerant nature of class I connections, calls admitted on to class I connections are afforded a priority over those of the other two classes at hand-offs.

Class II connections encompass data connections which support applications requiring reliable transport. Calls utilizing a standard transmission control protocol (TCP) typify such connections. In contrast to class I, class II connections may be "put on hold" when a radio congestion state is encountered. Relying on the transport protocol of the packets for example, the end-to-end connection control entities detect any congestion, and reduce or even stop the flow of the packets when such congestion occurs. As a result, class II connections are more susceptible to delays (or even packet losses) in a congestion state than under normal conditions. Once the congestion state is over, the normal flow of packets in the network resumes. An important QOS metric for a class II connection is thus an overload probability, which measures the likelihood of occurrences of the radio congestion state. The average duration of the congestion state is another important QOS metric for this class. Also important is the QOS metric of a minimum bandwidth service probability. This probability measures the percentage of a connection duration during which the class II connection is afforded bandwidth more than a specified amount.

Class III connections are those for applications such as paging which only require the network to deliver, in its best effort, individual messages which are delay tolerant. Thus, class III connections normally utilize protocols similar to a standard user datagram protocol (UDP). Class III traffic is only allowed to take advantage of the extra capacity of the wireless network not consumed by class I or II connections. That is, class III packets are stored in mobile terminals until wireless connections become available which are no longer consumed by class I or class II traffic. As such, an average queuing delay is an important QOS metric for class III packets.

Cell-cluster controller 29 administers the call admission control in accordance with the invention. The purpose of the call admission control is to limit the number of in-progress wireless calls within a cell-cluster such that, once a wireless call is admitted, the network can deliver the QOS's guaranteed at admission. In other words, once the wireless call is admitted to the cell-cluster, it will enjoy the prescribed QOS's during its connection lifetime.

Figures 2, 3:
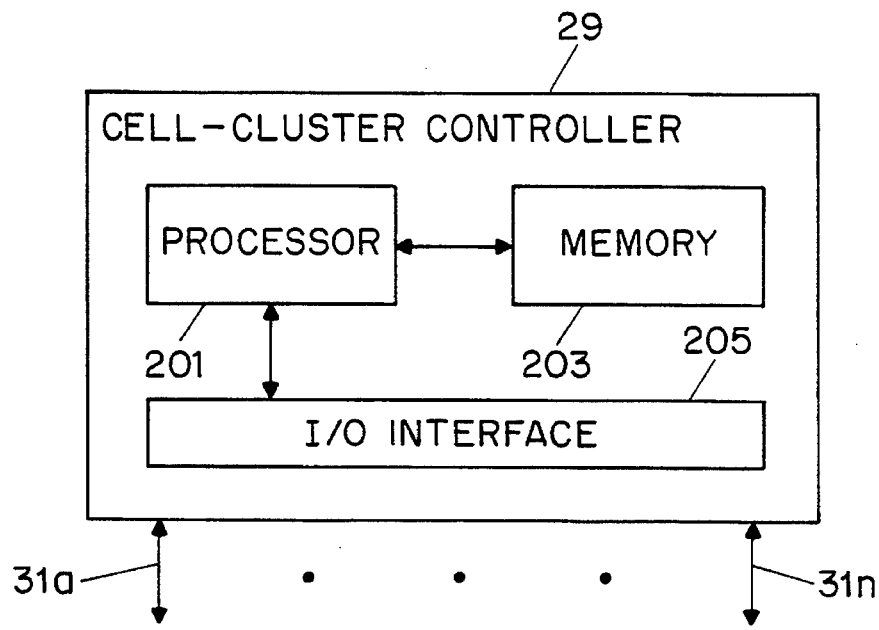
FIG. 2 is a block diagram of a cell-cluster controller used to administer call admission controls in the network of FIG. 1.
FIG. 3 is a connection table for the call admission controls stored in the cell-cluster controller of FIG. 2.

Turning to FIG. 2, cell-cluster controller 29 comprises processor 201 of conventional design, memory 203 which may be a standard programmable read-only-memory (PROM), and conventional input/output (I/O) interface 205. The latter is connected to base stations 17a through 17n via communication links 31a through 31n, respectively. In a well-known manner, interface 205 controls the I/O of the communications between controller 29 and the base stations. One such communications occur when a mobile user initiates a call from a cell, and in a standard way the base station associated with that cell is informed of the call request. Such a request is conveyed from the base station to controller 29 through the respective link.

In order to effectively administer the call admission control in accordance with the invention, controller 29 has in memory 203 a connection table for determining whether a call initiated in a cell of cell-cluster 45 should be admitted. FIG. 3 illustrates a particular connection table corresponding to selected types of connections, in terms of their class and QOS requirements. In this illustrative embodiment, three types of connections are provided, namely, types A, B and C. Type A connections are those of class I with a maximum dropping probability equal to $\alpha$; type B connections are those of class II with an average overload period equal to $\beta$ units of time; and type C connection are those of class II with an average packet delay equal to $\Gamma$ units of time, where $\alpha$, $\beta$ and $\Gamma$ are preselected numbers.

Each row of the connection table enumerates a possible combination of maximum numbers of type A, B and C connections that can coexist in cell-cluster 45, with all the requirements satisfied. For example, the first row indicates that, with zero type B connection, cell-cluster 45 can accommodate a maximum of 10 type C connections and K type A connections, where K is an integer. The second row indicates that, with a maximum of K-1 type A connections, cell-cluster 45 can accommodate a maximum of one type B and five type C connections. The table also indicates that, with zero type A and type C connection, cell-cluster 45 can accommodate a maximum of L type B connections, where L is an integer. With zero type A and type B connection, cell-cluster 45 can accommodate a maximum of M type C connections, where M is an integer. The particular numbers in the table of FIG. 3 may be obtained by simulating wireless call traffic in cell-cluster 45, or studying the history of the call traffic, using a conventional technique. As a prerequisite, the call admission control in accordance with the invention requires that, if a new call is admitted, the resulting numbers of type A, B, and C connections in cell-cluster 45 each do not exceed the respective maximum limit in at least one row of the table of FIG. 3. Because call characteristics including call patterns, hand-over rates, and call holding and duration statistics vary from one cell-cluster to another, each cell-cluster controller in network 12 most likely has a different connection table corresponding to more or fewer types of connections.

Figure 4:
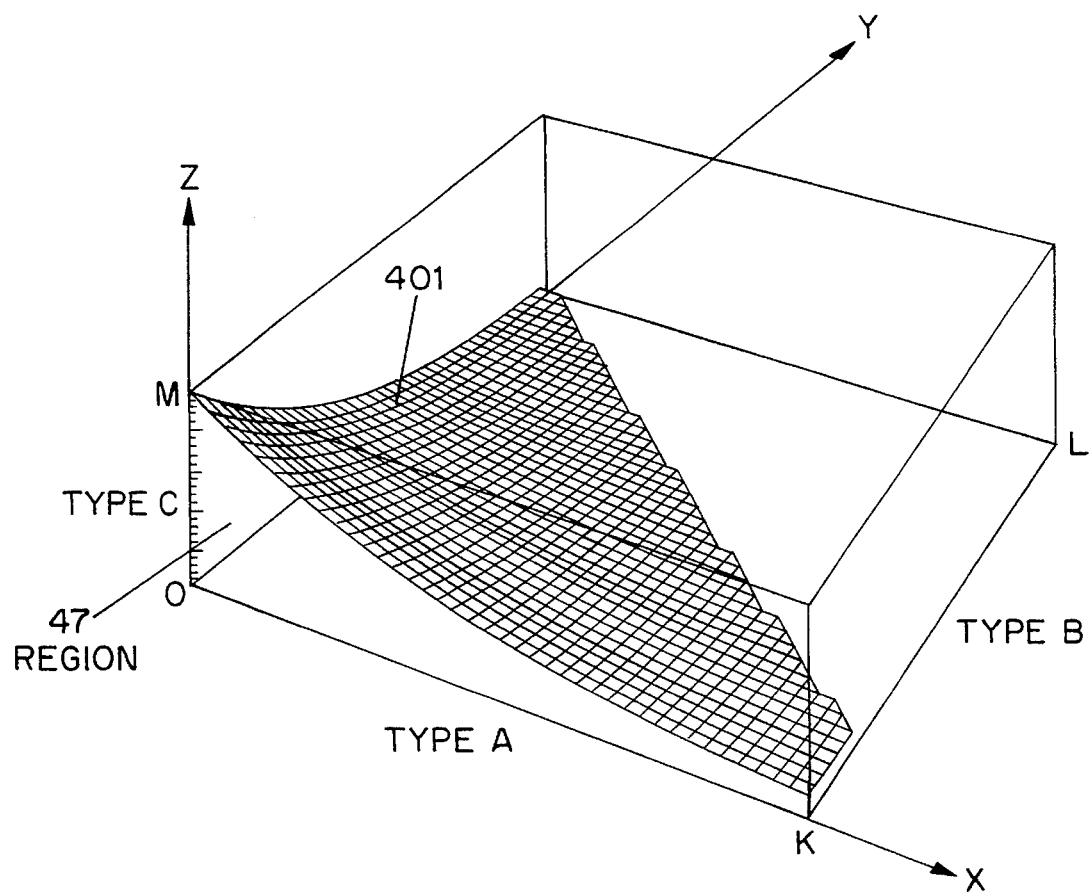
FIG. 4 is a graph representing the table of FIG. 3.

FIG. 4 is a graph representing the table of FIG. 3 in a three-dimensional space defined by X, Y and Z axes. Each row of the table corresponds to a different point on the graph realized as surface 401. The X-value of the point equals the number of type A connections in the row corresponding thereto. Similarly, the Y-value equals the number of type B connections, and the Z-value equals the number of type C connections in the same row. Also shown in FIG. 4 is call admission region 47 which occupies the space between the X-Y plane and surface 401, inclusive. With call admission region 47, the satisfaction of the above prerequisite of the call admission control can be visually determined. Specifically, the prerequisite is satisfied if after admission of a new call, the resulting numbers of type A, B and C connections in cell-cluster 45 define a point within call admission region 47.

Figure 5:
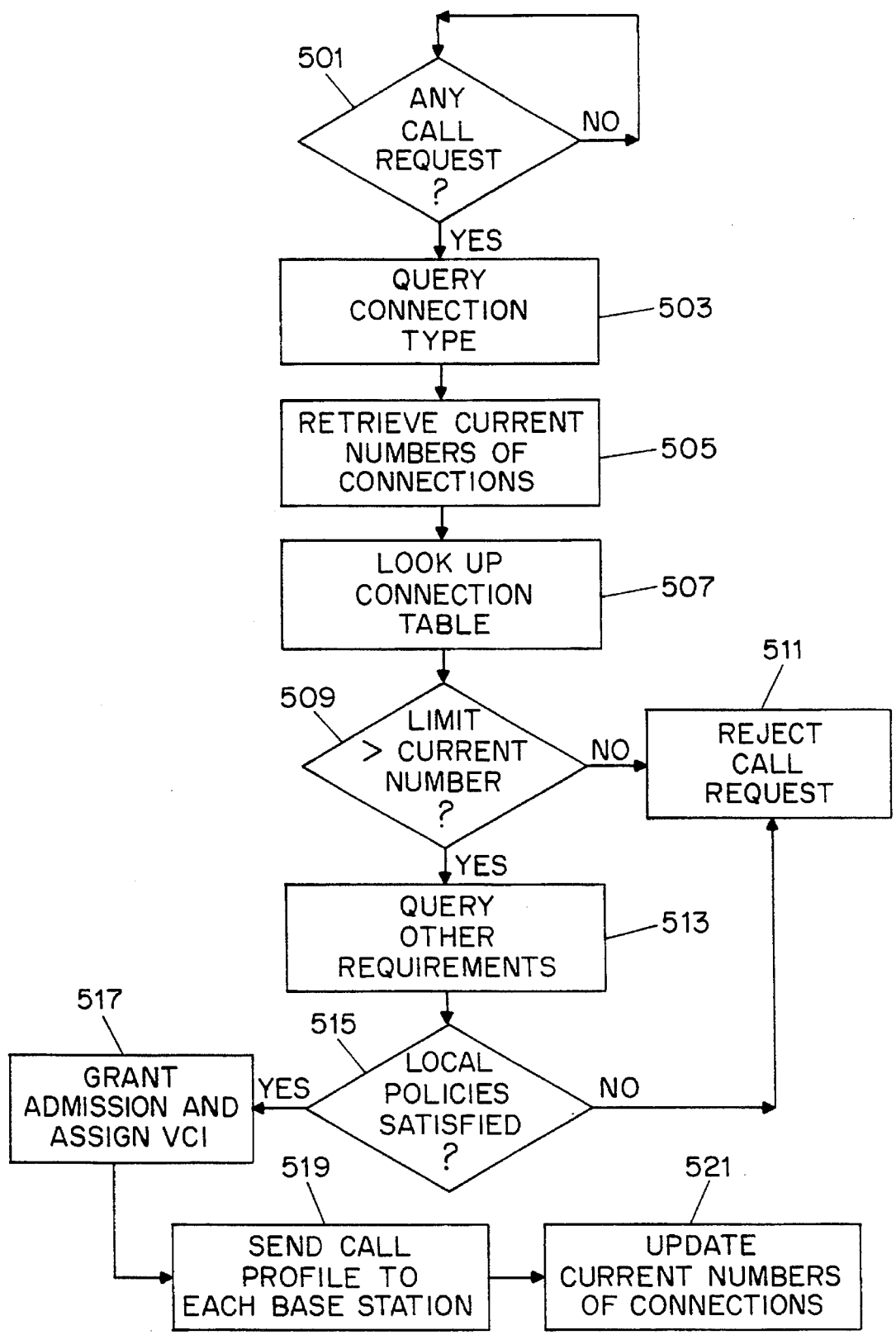
FIG. 5 is a flow chart depicting a call admission control process run by the controller of FIG. 2.

The process run by cell-cluster controller 29 to administer the call admission control in accordance with the invention will now be described. The process is programmed in memory 203 and its steps are illustrated in FIG. 5. Instructed by such a process, processor 201 monitors cell-cluster 45 for any call requests from base stations 17a through 17n, as indicated at step 501. In the event that a mobile user within cell-cluster 45 initiates a call request, processor 201 negotiates with the mobile user for connection requirements through the base station associated therewith.

Specifically, processor 501 queries the mobile user as to the type of connections required, as indicated at step 503. By way of example, but not limitation, the mobile user in this instance requests, say, a type A connection. Processor 201 records in memory 203 the current numbers of connections of types A, B, and C which have been admitted and not yet terminated in cell-cluster 45. At step 505, processor 201 retrieves the current numbers of the different connections from memory 203. Processor 201 then proceeds to step 507 where it looks up the connection table of FIG. 3 and searches for a row which contains the numbers of type B and C connections identical to and/or just larger than the respective current numbers. Processor 201 then determines at step 509 whether the number of type A connections appearing in the row just identified is greater than the current number of type A connections. If it is not greater, processor 201 rejects the call request initiated by the mobile user through the associated base station, as indicated at step 511. Otherwise, processor 201 proceeds to step 513 where it further queries the mobile user as to other requirements such as bandwidth, call holding time and hand-off rate requirements.

After collecting the necessary information which forms a call profile of the requested connection, processor 201 reviews the local policies of each cell in cell-cluster 45, including the sharing and scheduling policies of the different call classes in the cell, as indicated at step 515. The sharing and scheduling policies may particularize the proportions of the cell bandwidth which need to be maintained among the different classes of connections. If upon review the local policies are not satisfied, processor 201 returns to step 511 where the call request is again rejected. Otherwise, processor 201 grants admission of the requested call to the cell where the mobile user is in, and assigns an unused VCI to the newly-admitted call for identification, as indicated at step 517. Processor 201 then sends at step 519 the profile of the new call, along with its VCI, to each base station so that the same profile need not be elicited during a future hand-off. Finally, at step 521, processor 201 updates memory 203 to reflect the latest numbers of the different types of connections in cell-cluster 45.

Figure 6:
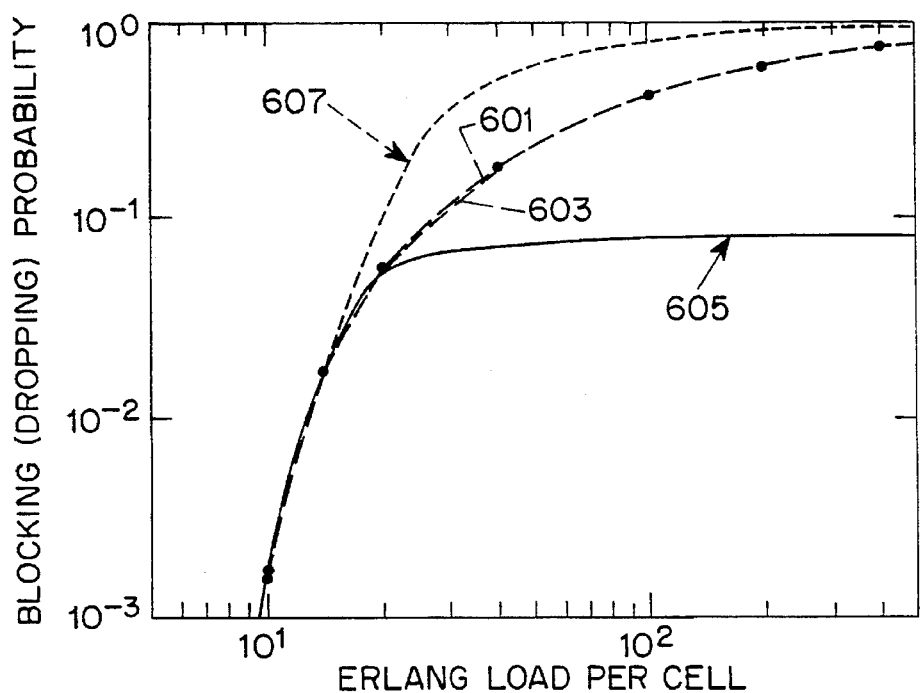
FIGS. 6 and 7 are graphs demonstrating the advantages of mobile communications systems in accordance with the invention.

Examples illustrating the advantages of the invention are in order. Without loss of generality, network 12 in this example is a homogeneous system supporting only class I connections. The average call duration is 0.5 unit of time, and the average time spent communicating with any particular base station before handing-off to another is 0.1 unit of time. Moreover, the call admission control in this example based on cell-clusters each consisting of 20 cells (as opposed to 14 cells in cell-cluster 45), each of which can support up to 20 class I connections. New call requests are rejected after 320 calls are admitted to the cell-cluster. In FIG. 6, the QOs's provided by a controlled system in accordance with the invention are compared with those provided by an uncontrolled system as in prior art. The horizontal axis represents the Erlang load of new calls per cell, and the vertical axis represents the QOS of a new call blocking or hand-off dropping probability. Dashed lines 601 and 603, which virtually coincide with each other, respectively represent the hand-off dropping and new call blocking probabilities in the uncontrolled system. On the other hand, solid line 605 and dotted line 607 respectively represent the hand-off dropping and new call blocking probabilities in the inventive system.

It is important to note from FIG. 6 that cluster-based wireless call admission control does not noticeably reduce the utilization efficiency (defined below) of the base stations under normal conditions since the new call blocking probability of the uncontrolled system is very close to the new call blocking probability of the controlled system. Only under conditions of heavy load does the control mechanism increase the blocking of new calls such that with a high probability the wireless spectrum remains available to serve already admitted calls, thereby limiting the hand-off dropping probability to a prescribed maximum level.

Figure 7:
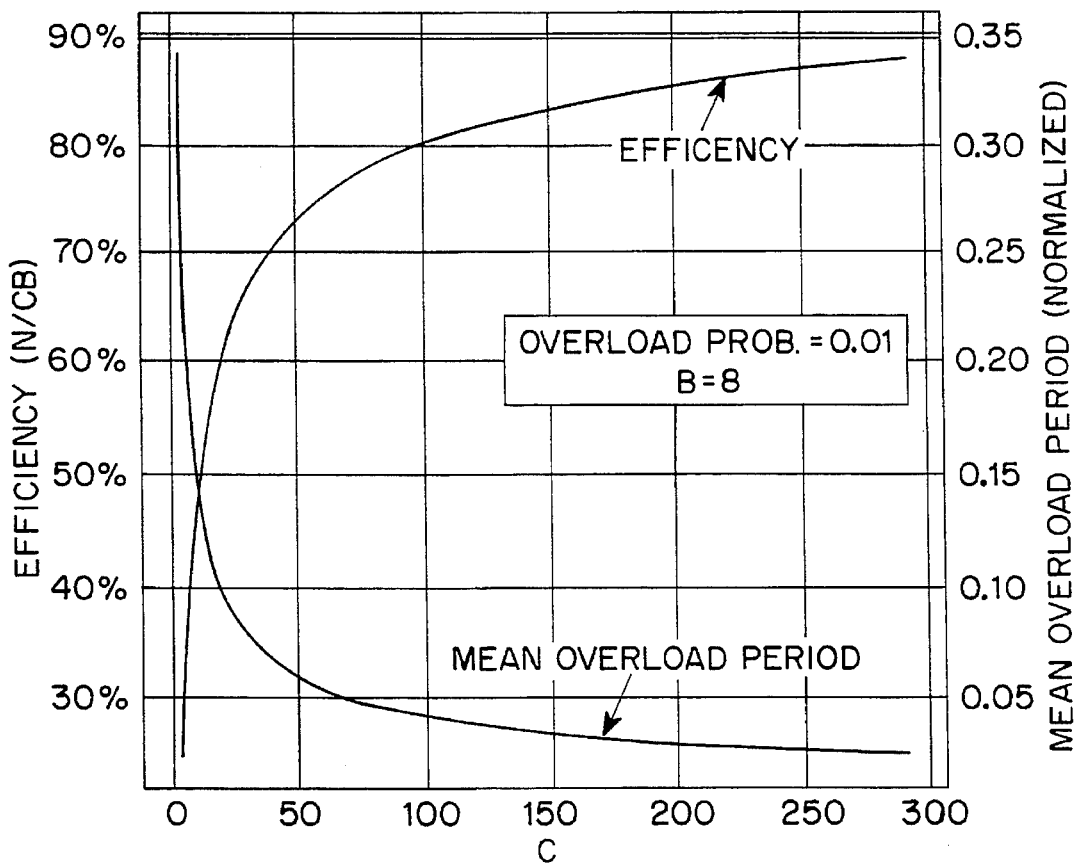

Again, without loss of generality, network 12 in this second example is a homogenous system supporting only class II calls. Referring to FIG. 7, the utilization efficiency here is defined as the maximum number of calls (N) admitted to a cell-cluster subject to certain guaranteed QOS's, normalized by the "raw" capacity of the cell-cluster containing B cells or base stations, each capable of handling up to C connections. In this instance, B=8 and the guaranteed QOS requires a maximum overload probability of 1%. Also plotted in FIG. 7 for the same system is the mean overload period, normalized by the mean time between hand-off events for any mobile user. As indicated in FIG. 7, as the capacity per base station increases, the cell-cluster utilization efficiency improves and the mean overload period decreases. That is, for a large base-station capacity, the instantaneous connection load is approximately balanced among the base stations.

It should be important to note that the above results can be extended to other systems having multiple classes of wireless traffic, with different QOS requirements.

The foregoing merely illustrates the principles of the invention. It will thus be appreciated that those skilled in the art will be able to devise numerous arrangements which, although not explicitly shown or described herein, embody the principles of the invention and are thus within its spirit and scope.

For example, in the disclosed embodiment call requests requiring certain classes of connections and QOS's are rejected when network 12 determines that satisfaction of such requirements cannot be guaranteed. However, the mobile users may insist on being connected to the network despite a lack of the guarantees. That is, the mobile users are willing to take a chance of having their calls connected regardless of the service quality. To this end, network 12 may accommodate such calls by marking in the respective call profiles their lower priority statuses, with respect to the guaranteed calls. Thus, when all the connections are consumed, guaranteed calls at hand-offs are afforded connections by disconnecting the existing marked calls, if any. In addition, it will be appreciated that a person skilled in the art will devise a hierarchy among the marked calls to establish the order of their disconnection when it becomes necessary. For example, since class I calls require real-time connections, and class II calls may be put on hold in case of a radio congestion state, class II marked calls would be disconnected in favor of any competing class I marked calls. Similarly, class III marked calls would be disconnected in favor of any competing class II marked calls.

We claim:

1. A cellular mobile communications system for establishing wireless connections in a plurality of cells comprising:

means for receiving call requests from said cells, which are grouped in at least one cell-cluster, said call requests including requests for establishing new wireless connections of different connection types, said connection types indicative of at least priorities of use of wireless channels in said system;

means for providing for each cell-cluster information including at least one combination of maximum numbers of wireless connections of said different connection types in the cell-cluster; and means for granting a selected call request including a request for establishing a new wireless connection of one of said different connection types, the grant of said selected call request based on a comparison of (a) the at least one combination of maximum connection numbers provided for a particular cell-cluster including the cell from which said selected call request was received, with (b) a combination of numbers of wireless connections of said different connection types currently established in said particular cell-cluster.

2. The system of claim 1 wherein said connection types are also indicative of particular standards of qualities of service guaranteed by said system.

3. The system of claim 2 wherein a metric for one of said qualities of service is a probability of dropping an established connection during a traffic congestion.

4. The system of claim 2 wherein a metric for one of said qualities of service is an average overload period during which traffic is heavily congested.

5. The system of claim 2 wherein a metric for one of said qualities of service is a probability of receiving at least a specified amount of bandwidth during a connection lifetime.

6. The system of claim 2 wherein a metric for one of said qualities of service is an average delay of traffic.

7. The system of claim 1 wherein wireless connections of one of said different connection types support real-time video and/or voice communications.

8. The system of claim 1 wherein wireless connections of one of said different connection types support data communications.

9. The system of claim 1 wherein wireless connections of one of said different connection types support communications traffic tolerant of delays.

10. The system of claim 1 further comprising means for marking selected wireless connections to indicate their lower priorities of wireless channel use than other wireless connections, regardless of connection types of the selected connections.

11. A cellular mobile communications system covering a plurality of cells comprising:

means for establishing wireless connections in said cells, which are grouped in at least one cell-cluster;

said wireless connections being of different connection types, said connection types indicative of priorities of use of wireless channels in said system;

means for initiating from said cells call requests for establishing new wireless connections;

means for providing for each cell-cluster information including at least one combination of maximum numbers of wireless connections of said different types in the cell-cluster; and means responsive to each call request for comparing (a) the at least one combination of maximum connection numbers provided for a particular cell-cluster including the cell from which the call request was initiated, with (b) a second combination of corresponding numbers of wireless connections of said different connection types currently established in said particular cell-cluster, said comparing means including means for allowing the call request and establishing a new wireless connection of a particular connection type if the number of connections of said particular connection type in said second combination is smaller than the corresponding maximum number in said at least one combination, and all the remaining numbers in said second combination are not greater than the corresponding maximum numbers in said at least one combination.

12. The system of claim 11 wherein said connection types are also indicative of particular standards of qualities of service guaranteed by said system.

13. The system of claim 12 wherein a metric for one of said qualities of service is a probability of dropping an established connection during a traffic congestion.

14. The system of claim 12 wherein a metric for one of said qualities of service is an average overload period during which traffic is heavily congested.

15. The system of claim 12 wherein a metric for one of said qualities of service is a probability of receiving at least a specified amount of bandwidth during a connection lifetime.

16. The system of claim 12 wherein a metric for one of said qualities of service is an average delay of traffic.

17. The system of claim 11 wherein wireless connections of one of said different connection types support real-time video and/or voice communications.

18. The system of claim 11 wherein wireless connections of one of said different connection types support data communications.

19. The system of claim 11 wherein wireless connections of one of said different connection types support communications traffic tolerant of delays.

20. The system of claim 11 further comprising means for marking selected wireless connections to indicate their lower priorities of wireless channel use than other wireless connections, regardless of connection types of the selected connections.

21. A method for establishing wireless connections in a plurality of cells in a cellular mobile communications system comprising the steps of:

receiving call requests from said cells, which are grouped in at least one cell-cluster, said call requests including requests for establishing new wireless connections of different connection types, said connection types indicative of at least priorities of use of wireless channels in said system;

providing for each cell-cluster information including at least one combination of maximum numbers of wireless connections of said different connection types in the cell-cluster; and granting a selected call request including a request for establishing a new wireless connection of one of said different connection types, the grant of said selected call request based on a comparison of (a) the at least one combination of maximum connection numbers provided for a particular cell-cluster including the cell from which said selected call request was received, with (b) a combination of numbers of wireless connections of said different connection types currently established in said particular cell-cluster.

22. The method of claim 21 wherein said connection types are also indicative of particular standards of qualities of service guaranteed by said system.

23. The method of claim 22 wherein a metric for one of said qualities of service is a probability of dropping an established connection during a traffic congestion.

24. The method of claim 22 wherein a metric for one of said qualities of service is an average overload period during which traffic is heavily congested.

25. The method of claim 22 wherein a metric for one of said qualities of service is a probability of receiving at least a specified amount of bandwidth during a connection lifetime.

26. The method of claim 22 wherein a metric for one of said qualities of service is an average delay of traffic.

27. The method of claim 21 wherein wireless connections of one of said different connection types support real-time video and/or voice communications.

28. The method of claim 21 wherein wireless connections of one of said different connection types support data communications.

29. The method of claim 21 wherein wireless connections of one of said different connection types support communications traffic tolerant of delays.

30. The method of claim 21 further comprising the step of marking selected wireless connections to indicate their lower priorities of wireless channel use than other wireless connections, regardless of connection types of the selected connections.

31. A method for use in a cellular mobile communications system covering a plurality of cells comprising the steps of:

establishing wireless connections in said cells, which are grouped in at least one cell-cluster; said wireless connections being of different connection types, said connection types indicative of priorities of use of wireless channels in said system;

initiating from said cells call requests for establishing new wireless connections;

providing for each cell-cluster information including at least one combination of maximum numbers of wireless connections of said different types in the cell-cluster; and in response to each call request, comparing (a) the at least one combination of maximum connection numbers provided for a particular cell-cluster including the cell from which the call request was initiated, with (b) a second combination of corresponding numbers of wireless connections of said different connection types currently established in said particular cell-cluster, said comparing step including the step of allowing the call request and establishing a new wireless connection of a particular connection type if the number of connections of said particular connection type in said second combination is smaller than the corresponding maximum number in said at least one combination, and all the remaining numbers in said second combination are not greater than the corresponding maximum numbers in said at least one combination.

32. The method of claim 31 wherein said connection types are also indicative of particular standards of qualities of service guaranteed by said system.

33. The method of claim 32 wherein a metric for one of said qualities of service is a probability of dropping an established connection during a traffic congestion.

34. The method of claim 32 wherein a metric for one of said qualities of service is an average overload period during which traffic is heavily congested.

35. The method of claim 32 wherein a metric for one of said qualities of service is a probability of receiving at least a specified amount of bandwidth during a connection lifetime.

36. The method of claim 32 wherein a metric for one of said qualities of service is an average delay of traffic.

37. The method of claim 31 wherein wireless connections of one of said different connection types support real-time video and/or voice communications.

38. The method of claim 31 wherein wireless connections of one of said different connection types support data communications.

39. The method of claim 31 wherein wireless connections of one of said different connection types support communications traffic tolerant of delays.

40. The method of claim 31 further comprising the step of marking selected wireless connections to indicate their lower priorities of wireless channel use than other wireless connections, regardless of connection types of the selected connections.

* * * * *

UNITED STATES PATENT AND TRADEMARK OFFICE
CERTIFICATE OF CORRECTION

PATENT NO. : 5,497,504
DATED : March 5, 1996
INVENTOR(S) : Anthony S. Acampora et al.

It is certified that error appears in the above-indentified patent and that said Letters Patent is hereby corrected as shown below:

Col. 1, before line 5, insert -- The United States Government has certain rights in this invention pursuant to Contract CDR-881111 awarded by the National Science Foundation. --; line 20, "Cells" should read -- "cells" --. Col. 2, line 8, "Iet" should read -- I et --. Col. 5, line 33, "QoS's" should read -- QOS's --. Col. 8, line 20, "example" should read -- example is --; line 25, "QOs's" should read -- QOS's --.

Signed and Sealed this

Tenth Day of June, 1997

Attest:

BRUCE LEHMAN

*Attesting Officer*

*Commissioner of Patents and Trademarks*